Feb. 2, 1943. T. C. SMITH 2,309,804
SIGNALING DEVICE FOR CLOSED TANKS
Filed March 1, 1940
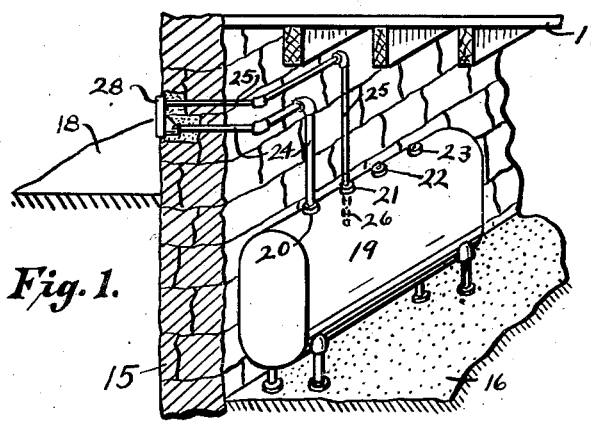
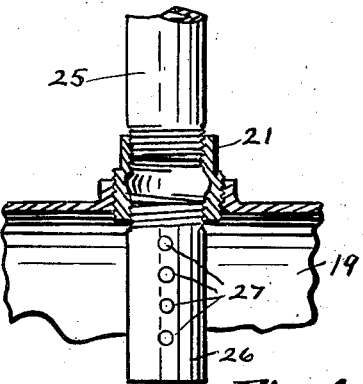
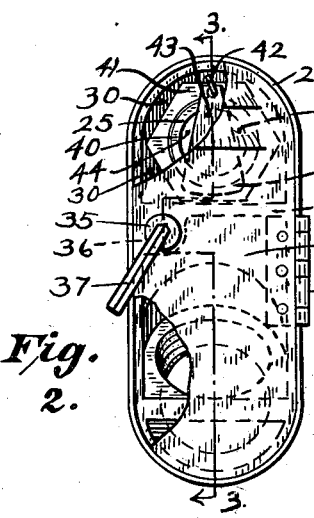
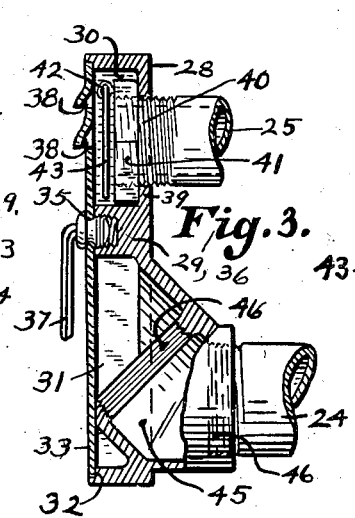
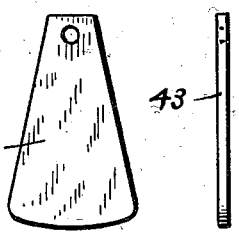
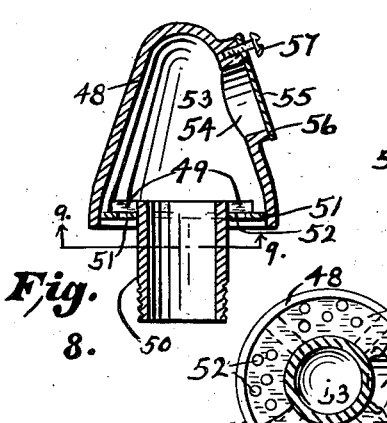
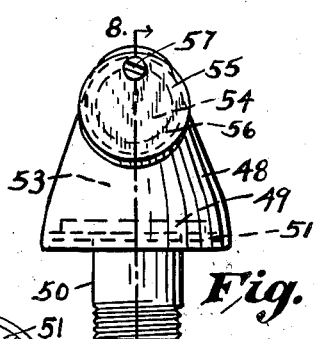
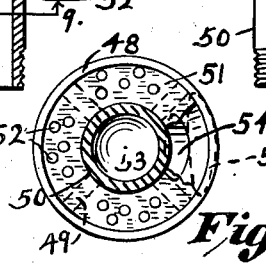
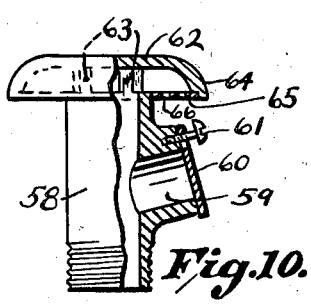
Inventor,
Theodore C. Smith,
by his attorney,
J. Edward Thebaud.

Patented Feb. 2, 1943

2,309,804

UNITED STATES PATENT OFFICE 2,309,804

SIGNALING DEVICE FOR CLOSED TANKS

Theodore C. Smith, Philadelphia, Pa.

Application March 1, 1940, Serial No. 321,741

7 Claims. (Cl. 116—109)

This invention relates to signaling devices for closed tanks or containers, and particularly to such signaling devices as are operated by air forced out of a closed oil or gasoline tank through a vent pipe, as the tank is being filled.

Considering the common case of an oil tank that is buried or is located within a basement of a building, it is usual to have a filling pipe running from the tank to an outside location where the filling end of the pipe is situated at a point readily accessible to the operator, who fills the tank. It is also customary to have a vent line of pipe leading from a separate connection with the top of the tank to an outdoor point.

Sound signaling devices, connected with the vent line, have been devised to give the operator a warning sound, which is effective more by some modification of the regular sound and its stoppage, than by its continued, ordinary characteristics. This is affected by having the vent pipe project down a short distance into the tank, to a level approaching that of complete filling, so that the liquid, when it reaches the end of the vent pipe will completely shut off further exit of the air and thus any signal depending for its operation upon the current of exhausting air, would have to stop unless some form of side openings in the pipe, above the oil sealed end thereof, and within the tank, are provided for some further, but greatly reduced exit of air which reduced flow of air would cause a modification, as a slowing down of the signal, enabling the operator to visualize the approach to his complete filling of the tank, thus giving him warning of the time to cease the filling.

One of the objects of my invention is to provide a form of signaling device in connection with the vent pipe of a closed tank or container, such as above described, having the signaling element located where it can be readily observed and which in its operation will be distinctively effective in warning the operator of his approach to the liquid filling of the tank or container, and at the same time provide such a construction of signaling device as will prove both reliable and of economical cost of manufacture.

A further object of my invention is to provide a signaling device of the class above referred to, having the signal element located to be observable, both by sight and by sound as when the signal element is suspended to dangle in the current of air coming from the vent pipe, having this signaling element made of a thin resonant metal that will tinkle as it knocks against adjoining metal parts.

A further object is to provide a signaling device of the class referred to, which, while fulfilling any or all of the above named objects, will be adapted to be incorporated with a form of vent cap, covering the outdoor end of the vent pipe, while having the same located in observable proximity to the filling end, of the filling pipe.

Another object is to provide in a signaling device for tanks or containers, a junction box to which are connected the exhaust end of the vent pipe, and the filling end of the filling pipe, having said box formed with independent compartments, one for each of the above pipe ends referred to, having a wall between said compartments and having a releasable closure adapted to cover both said compartments and the outer edge of said wall at the same time, but having louvered openings in that part of the closure, that covers the compartment receiving the vent pipe, which compartment is to contain the signaling element.

A further object is to provide in a signaling device for tanks or containers, a junction box, which, while fulfilling the last named object, will be formed, particularly for economical reasons, to have said compartments made comparatively shallow, except having the filling compartment provided with an inclined extension to the rear, having the wall of this extension terminate rearwardly in a cylindrical portion adapted for connection with the filling end of the filling pipe.

With these and other objects, which will hereinafter appear, my invention resides in certain construction, various embodiments of which are illustrated in the drawing and are hereinafter described. The operation is explained and what I claim is set forth.

In the drawing:

Figure 1 is a perspective view of an oil tank installed in the basement of a building, showing a form of my signaling device, connected by piping, with the tank.

Figure 2 is a front elevation of a junction box having the discharge end of the air vent and the filling end of the filling pipe, entered therein and showing also a form of signal connected with the air vent.

Figure 3 is a section taken on the line 3—3 of Figure 2.

Figure 4 is a sectional elevation showing a fragment of the top of an oil tank, with the air vent pipe projecting within.

Figure 5 is an elevation of a form of signaling element, shown assembled with other parts in Figures 2 and 3.

Figure 6 is a side or edge elevation of the element shown in Figure 5.

Figure 7 is a front elevation of another form of signaling device embodying my invention, adapted to be connected with the discharge end of the vent pipe.

Figure 8 is a section taken on the line 8—8 of Figure 7.

Figure 9 is a section taken on the line 9—9 of Figure 8, showing the apertured ring plate, used with the form of device, shown in Figures 7 and 8.

Figure 10 is a sectional side elevation of another form of my signaling device adapted to be connected with the discharge end of the vent pipe.

In the figures, referring first to Figure 1, there is illustrated a fragment part of a basement of a building, having an outer wall 15, with a floor 16 and a ceiling 17. 18 is the outside grade level of the ground surface. Shown standing upon the floor 16, is the oil tank 19, having in its top part the four closure connections 20, 21, 22 and 23. In open communication with the tank 19 is the filling pipe 24 joined with the connection 20. 25 is the vent pipe joined with the connection 21, and has a long nipple 26 reaching down into the tank 19. The connection 21, shown in detail in Figure 4, is a bushing threaded at each end. The upper end, is threaded with the vent pipe 25, while the lower end is threaded with the long nipple 26. If desired, openings 27, in the nipple 26, can be provided as shown, for cutting down the discharge of air, forced out of the tank 19, during its filling, or such openings may be omitted, in which case no air would flow from the tank, after the lower end of the nipple 26 is sealed off by the rising liquid.

Referring again to Figure 1, there is shown on the outer face of the wall 15, a junction box 28, into which leads the filling end, of the filling pipe 24, and the discharge end, of the vent pipe 25.

The junction box 28 is also shown in the enlarged figures 2 and 3, wherein the hollow of the box 28 is divided by the partition wall 29 into two compartments 30 and 31. The outer edge of this wall 29 is located in the plane of the recess 32, into which the door 33 fits when it is closed. The door 33 swings on a hinge 34 and is secured against opening, when shut, by means of the threaded piece 35, journaled on the door 33 in a manner to be retained thereon. This piece 35 is adapted to be screwed into a lug portion 36 in the partition wall 29. A lever key 37 fits into the piece 35, to turn it. Where that part of the door 33 covers the vent compartment 30 there is shown two louvered openings 38.

This compartment 30 has entering its rear wall 39, the discharge end 40, of the vent pipe 25, leading out of the tank 19. A nut 41, engaging the pipe end 34, secures the pipe to the box 28. Fixed in the top of the nut 41, is screw-eye 42, from which loosely hangs and is secured the thin plate 43, which is preferably made of resonant metal adapted to tinkle when the plate 43 hits the nut 41, as it is fluttered in the current of air coming from the vent pipe 25. The plate 43 is preferably formed to be tapered divergently downward as shown in Figures 2 and 5. As this plate 43 hangs on the screw eye 42, shown in Figures 2 and 3, there is left uncovered certain open portions 44, at the mouth of the pipe 25, insuring always to some extent a free passage for the air to pass by the plate 43.

Considering the compartment 31, of the box 27, there is an inclined extension 45, leading to the filling pipe 24, which is shown screwed into the threaded portion 46, of the box 28. In the wall of the compartment 31. is shown a threaded portion 47, adapted to have screwed into it an inclined pipe, extending up and outside the box 28, for filling purposes. It will be observed that the compartment 30 of the box 28 is comparatively shallow, as is the front portion of the compartment 31, which is extended rearwardly and inclined downward to join the pipe 24. In making the junction box 27 in this form a considerable saving in material is had, which also provides a lighter weight box, as only such shaped compartments need be provided as are actually needed.

Considering the form of cap vent shown in Figures 7, 8, and 9, there is a conical top portion 48, integral with arms 49, radiating from the top of the cylindrical portion 50. Fixed to the under side of the arms 49, is the apertured flat ring 51, with holes 52. The lower end of the portion 50 is shown threaded and is adapted for connection with the discharge end of the vent pipe 25. This portion 50 and the compartment 53 of the top portion 48 are in open communication. The compartment 53 has a side opening 54, covered by a plate 55, which hangs in an inclined direction against the mouth 56 of the opening 54. The plate 55 loosely hangs from a screw 57, fixed in the portion 48.

A modified form of vent cap shown in Figure 10, has a threaded, cylindrical portion 58 with a side outlet 59, covered by an inclined plate 60, which loosely hangs from a screw 61, fixed in portion 58. The portion 58 is integral with the cover portion 62, thru the slender and spaced extensions 63. The cover portion 62 has a flange 64 and fixed between the flange 64 and the cylindrical portion 58 is a flat ring plate 65, with holes 66 thru it.

In operation, assuming that the supply operator discharges oil from the nozzle of his hose into the compartment extension 45, after opening the door 33. The oil then follows down the filling pipe 24 into the tank 19, and as the tank fills, air within the tank is forced up and out of the vent pipe 25, causing the plate or blade 43 to flutter vigorously, striking against the nut 41, and being thin and made of a resonating metal, a distinct bell-like sound is made. If the plate 43 is too thick to give off a distinct bell-like sound, when knocking against the nut 41, it will at least emit a knocking sound. After the oil in the tank has reached and immersed the lower end of the nipple extension 26, to the vent pipe 25, no more air could pass up pipe 25, if there were no side openings 27 in the nipple extension 26, and in that case the fluttering of the plate 43 would stop as a sudden warning to the operator to shut off the supply. On the other hand, if the nipple extension 26 has side openings 27, vertically spaced, air can be forced thru these openings, but in a much reduced volume to pass up thru the vent pipe 25, but the fluttering of the plate 43 will be slowed down noticeably, and this fluttering will continue to be reduced as more of the holes 27 are covered by the rising liquid, thus lengthening the time of warning to the operator to cease pouring oil in at the junction box 28. In making the signal plate 43, the tapered shape shown, is proportioned to the area of the discharge opening, in the end 40, of the vent pipe 25, to leave two uncovered portions 44, to this opening, permitting free access of air to be sucked into the tank 19, as the oil is drawn down by use.

Where a vent cap signaling device, as shown in one form in Figures 7, 8 and 9, or in another form as in Figure 10, is used, instead of the signaling device, just described in connection with the junction box 28, the inlet end of the filling pipe 24 is positioned at another point, so that air can be sucked in thru the apertured plate 51, in the case of the device shown in Figures 7, 8, and 9, or thru the apertured plate 65, of the device shown in Figure 10. In such cases the dangling plate may cover the whole of the opening thru which exhaust air passes, from the vent pipe connected with the tank, while the exit of the air from the tank 19 is measurably reduced in quantity after the oil has risen above the level, of the lower end, of the nipple extension 26 and is forced thru the side holes 27, these being also cut off, one by one, as the tank continues to fill, resulting like in the case of the signal plate 43, associated with the junction box 28, in the slowing down of the fluttering of the plate 55, where the device shown in Figures 7 and 8 is used, and in the slowing down of the fluttering of the plate 60, where the device shown in Figure 10 is used.

While it is possible to devise other signaling devices as further modifications of the embodiments of my invention herein illustrated and described, without departing from the spirit of my invention, I wish to include all forms which come within the scope of the following claims.

I claim:

1. In a signaling device adapted to be used in connection with a closed tank for liquids, and having a filling pipe and a vent pipe connecting said device with sand tank, a junction box remote from said tank, and in which terminate open ends of said pipes in spaced relation to one another, a signal supporting member within said box positioned above the outlet of said vent pipe therein, and a dangling signal piece hanging to said supporting member, positioned within said box, to hang in front of the outlet of said vent pipe, within said box, and adapted to be shaken in a current of air, coming from said vent pipe.

2. In a signaling device made in accordance with claim 1, said signal piece being formed to emit a sound as it strikes part of said box, in its gyrations.

3. In a signaling device made in accordance with claim 1, said signal piece forming a partial closure to outlet of said vent pipe, permitting a slow current of air to pass said signal piece, without materially shaking the same.

4. In a signaling device adapted to be used in connection with a closed tank for liquids, and having a filling pipe and a vent pipe connecting said device with said tank, a junction box remote from said tank, and in which terminate open ends of said pipes in spaced relation to one another's outlets and open to the atmosphere, and a signal positioned in the line of air flow from the outlet of said vent pipe.

5. In a signaling device adapted to be used in connection with a closed tank for liquids, and having a filling pipe and a vent pipe connecting said device with said tank, a junction box remote from said tank, and in which terminate open ends of said pipes in spaced relation to one another's outlets and open to the atmosphere, and a signal located in said junction box contiguous the outlet of the vent pipe to be actuated by air flowing through and from said vent pipe.

6. In a signaling device adapted to be used in connection with a closed tank for liquids, and having a filling pipe and a vent pipe connecting said device with said tank, a junction box remote from said tank, and in which terminate open ends of said pipes in spaced relation to one another's outlets and open to the atmosphere, and signal means located entirely within the junction box across the outlet end of the vent pipe to be actuated by air issuing from said outlet end of said vent pipe.

7. A signaling device for closed tanks, in combination, a junction box having an opening for the discharge end of a vent pipe, open to the atmosphere, and an opening for the inlet end of a fill pipe, and an air operated signal member in said box in the line of air flow from the opening for the discharge end of the vent pipe.

THEODORE C. SMITH.